United States Patent [19]

Shepley et al.

[11] Patent Number: 4,747,810
[45] Date of Patent: May 31, 1988

[54] BELT DRIVE WITH SELF-ALIGNING IDLER

[75] Inventors: Laurel A. Shepley, Wapello, Iowa; Rodney G. Koertner, Auburn, Wash.

[73] Assignee: Deere & Company, Moline, Ill.

[21] Appl. No.: 311,374

[22] Filed: Oct. 14, 1981

Related U.S. Application Data

[63] Continuation of Ser. No. 56,376, Jul. 10, 1979, abandoned.

[51] Int. Cl.⁴ .............................................. F16H 7/12
[52] U.S. Cl. .................... 474/135; 474/199; 474/903; 384/192; 384/206; 384/547
[58] Field of Search .......... 474/123, 199, 102, 903, 474/132–138, 63–65; 308/18, 72, 61, 190; 403/76, 158, 131; 198/806, 842; 226/194, 169, 170, 171, 172; 301/1; 305/27; 16/47; 384/192, 206, 547

[56] References Cited

U.S. PATENT DOCUMENTS

| | | | |
|---|---|---|---|
| 526,013 | 9/1894 | Howard | 308/18 |
| 807,157 | 12/1905 | DeGree et al. | 474/123 |
| 902,526 | 12/1908 | Hanson | 474/135 |
| 1,454,657 | 5/1923 | Smith | 308/72 |
| 1,606,747 | 11/1926 | Carter | 308/72 |
| 1,622,447 | 3/1927 | Kalberer | 16/47 |
| 1,689,750 | 10/1928 | Redfield | 74/242.11 A |
| 1,808,728 | 6/1931 | Mitchell | 51/166 SB |
| 1,934,481 | 11/1933 | Beyl | 474/123 |
| 2,279,887 | 4/1942 | Hathorn | 254/398 |
| 2,282,589 | 5/1942 | Mayne | 295/11 |
| 2,349,281 | 5/1944 | Kendall | 384/547 |
| 2,421,685 | 6/1947 | Crot et al. | 308/18 |
| 2,499,287 | 2/1950 | Wilson | 474/84 |
| 2,593,158 | 4/1952 | Lorig | 226/192 |
| 2,786,305 | 3/1957 | Carter | 16/47 |
| 3,115,375 | 12/1963 | Haller | 308/72 |
| 3,198,411 | 8/1965 | Cope | 98/842 |
| 3,251,235 | 5/1966 | Cederberg et al. | 74/242.11 R X |
| 3,383,933 | 5/1968 | Shultz et al. | 474/135 |
| 3,464,282 | 9/1969 | Grobowski | 474/58 |
| 3,525,448 | 8/1970 | Bauer | 403/76 X V |
| 4,033,196 | 7/1977 | Maeda | 74/242.11 R |
| 4,109,976 | 8/1978 | Koch | 384/192 |
| 4,253,343 | 3/1981 | Black et al. | 474/135 |

FOREIGN PATENT DOCUMENTS

| | | | |
|---|---|---|---|
| 628204 | 9/1961 | Canada | 308/18 |
| 675386 | 5/1939 | Fed. Rep. of Germany | 308/72 |

Primary Examiner—John E. Murtagh
Assistant Examiner—Andrew Joseph Rudy

[57] ABSTRACT

A drive system preferably a belt drive in which a belt is trained about a pair of sheaves rotating on a pair of parallel axes and tensioned by an idler means intermediate the sheaves, the idler means being mounted on a carrier by means of self-aligning bearing means to enable the idler means to conform to irregularities in the belt during operation.

8 Claims, 2 Drawing Sheets

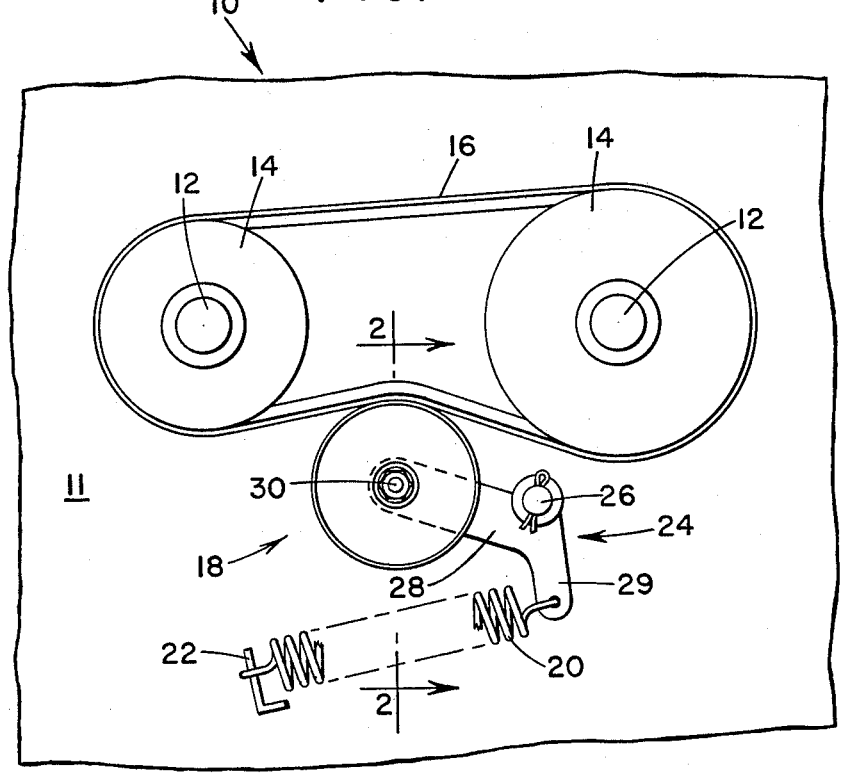
FIG. 1
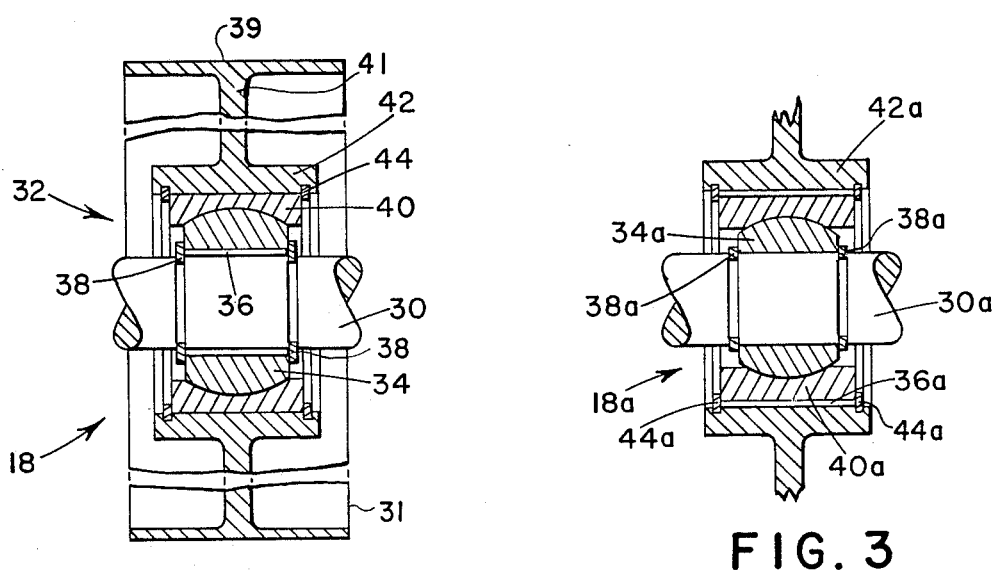
FIG. 2
FIG. 3

BELT DRIVE WITH SELF-ALIGNING IDLER

CROSS REFERENCE TO RELATED APPLICATION

This is a continuation of U.S. application Ser. No. 056,376, filed July 10, 1979, now abandoned.

BACKGROUND OF THE INVENTION

This invention is directed to drive systems such as belt or chain drives and more particularly to a novel idler for use with such drives.

A typical belt and sheave drive includes a pair of sheaves journaled on parallel axes and tensioned by an idler means engaging one run of the belt intermediate the sheaves and biased by a spring or the like to urge the idler means into constant engagement with the belt. Because of unevenness of belt stretch and wear and possible irregularities in manufacture or adjustment, an idler mounted on a simple cross shaft is subject to forces that aggravate the wear on the belt and bearings.

SUMMARY OF THE INVENTION

According to the present invention, prior difficulties are avoided by mounting the idler means on self-aligning bearing means that enable the idler to track better and to accommodate twisting and the like in the belt. This arrangement minimizes the necessity for extreme precision in manufacturing tolerances and at the same time keeps uniform tension across the width of the belt. A further feature is to employ a central mounting of the idler means by splitting the idler means into a pair of coaxially spaced apart idlers and mounting the two idlers by a central carrier, that avoids overturning torque present in a wide idler mounted on a long shaft unless a straddle mounting is employed, which is expensive and adds to the cost of the entire drive. The simplified design provided by the present invention enables the use of a more compact design.

DESCRIPTION OF THE DRAWINGS

FIG. 1 is an elevation of a typical belt drive incorporating one form of the invention.

FIG. 2 is a fragmentary section, taken along line 2—2 of FIG. 1, of an idler means.

FIG. 3 is a fragmentary sectional view similar to FIG. 2 but showing another form of an idler means of the invention.

DESCRIPTION OF THE PREFERRED EMBODIMENT

Figure 4:
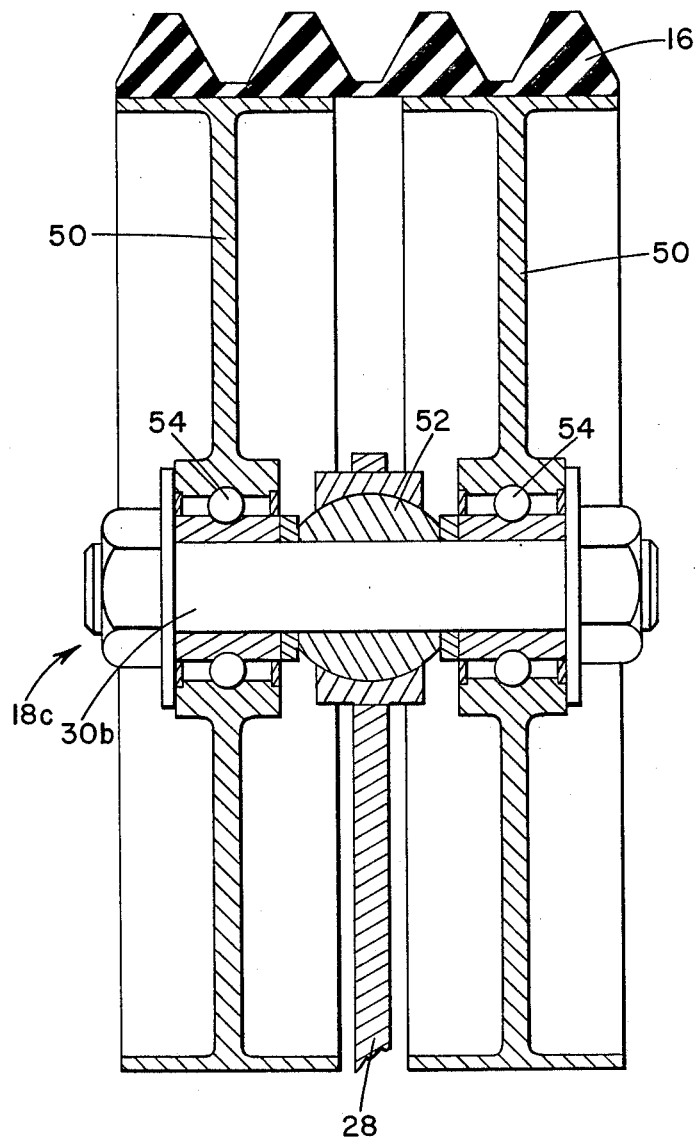
FIG. 4 is a fragmentary sectional view similar to FIG. 2 but showing a further form of an idler means of the invention.

This invention has application to all types of continuous loop drive systems such as belt and chain drives and to idlers for such drives. The invention will be explained hereinbelow in connection with a belt drive system which is the preferred embodiment of this invention.

In accordance with a preferred embodiment of this invention, FIG. 1 shows a belt drive 10 comprising a suitable support 11 carrying a pair of shafts 12 arranged on parallel axes. The shafts in turn carry a driven and a driving member or sheaves 14, here of the multiple-V type. A continuous loop means or a conforming belt 16 is trained about the sheaves and is tensioned by idler means 18 biased into engagement with one run of the belt, as by a spring 20 anchored to the support as at 22 and connected to an idler means carrier 24, shown here as a bell crank rockable on a support-mounted pivot 26, the idler means being carried by an arm 28 of the bell crank. As seen, the other arm 29 is connected to the spring 20. Alternatively (not shown) carrier 24 may be an arm slidably mounted in support 11 for movement toward and away from belt 16.

In one form of the invention (FIG. 2), the includes 24 carries a cross shaft 30 for journaling the idler means 18. The idler means is here a single pulley 31 having a cylindrical outer rim 39, of relatively wide dimension measured axially, and having a hub 42 located within the rim in centered relationship to axially opposite ends thereof and joined to the rim by a radially extending web 41. The shaft 30 extends axially through the hub 42 and mounting the hub for rotation on the shaft is a self-aligning bearing means 32 centered between axially opposite ends of the hub. In this case, the bearing means 32 comprises a substantially spherical member 34 mounted on the shaft by low-friction bearings means such as a needle bearing unit 36 held against axial shifting as by snap rings 38. An annular element 40 interiorly conforming to the spherical member and fitting within the hub 42 of the idler means embraces the member and mounts the idler means for substantially universal movement, here about a point forming the center of the spherical member 34. Thus, idler pulley 31 is journaled on the needle bearing unit 36 but rocks universally about the spherical member 34 to conform to irregularities in the belt during operation. The element 40 is confined to the hub 42 by snap rings 44.

FIG. 3 shows an alternate idler means 18a in which a spherical bearing member 34a is confined to a carrier shaft 30a by snap rings 38a and is embraced by an annular element 40a. A low-friction means, again a needle bearing unit 36a, is interposed between the element 40a and a hub 42a of the idler means and is confined by snap rings 44a. Similar to the embodiment of FIG. 2, idler means 18a is journaled on bearing unit 36a and is universally pivotal on spherical bearing 34a.

FIG. 4 shows an alternate and preferred embodiment of a self-adjusting idler means 18c (relative to those shown in FIGS. 2, 3) in accordance with this invention. Idler means 18c is split and comprises a pair of coaxial spaced pulleys 50 journaled on a shaft 30b by conventional low friction ball bearing units 54. The configuration and spacing of pulleys 50 is such as to accommodate the rather wide belt 16 at its flat, exterior side. The arm 28 of the carrier 24 is disposed in the axial space between the pulleys 50 and carries a self-aligning bearing means 52 through which a shaft 30b passes to have opposite projecting ends of equal length at each side of the arm. The self-aligning bearing means is centered between the ends of the shaft and each projecting end carries an idler 50. Thus, the idler means including the two pulleys 50 and shaft 30b rock universally as a unit and the results are substantially the same obtained in the FIGS. 2 and 3 forms except for the benefits obtained from splitting the idlers. The alternate bearing mountings of FIGS. 2 and 3 will suggest other mountings for the FIG. 4 construction.

Figure 5:
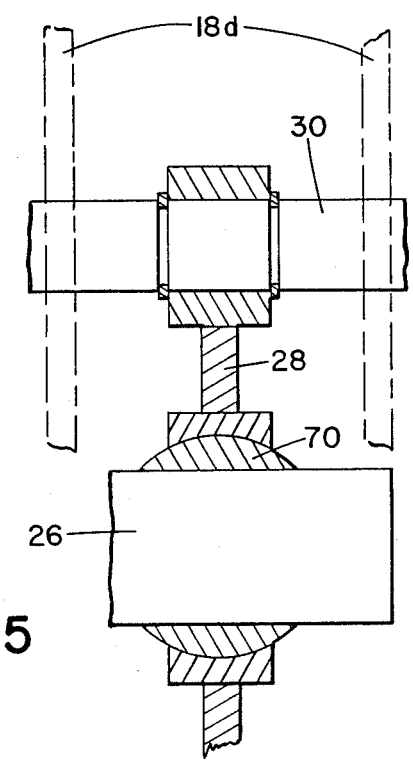
FIG. 5 is a fragmentary sectional view similar to FIG. 2 showing still another form of an idler means of the invention.

Still another embodiment of this invention is shown in FIG. 5 which is a fragmentary cross section of an idler means 18d and bell crank pivot 26. This embodiment is identical to FIG. 4 except that a spherical bearing 70 is mounted on pivot 26 rather than mounting of spherical bearing 52 on shaft 30b as in FIG. 4. This permits arm 28 and idler means 18d to be universally rockable as a unit on bearing 70 rather than only idler means 18c being universally rockable relative to arm 28 as in FIG. 4. This latter design otherwise functions the same and provides similar advantages as that of FIG. 4.

We claim:

1. In a belt drive including drive and driven sheaves respectively supported for rotation about a pair of fixed, parallel shafts, a belt trained about the sheaves, a fixed pivot located adjacent a run of the belt, and extending parallel to said shafts, an idler means carrier, an idler shaft extending parallel to said pivot, an idler pulley means being rotatably mounted on the idler shaft and including rim means having axially spaced opposite ends, said carrier being mounted to the pivot for movement toward and away from the run of the belt with the rim means being located for engaging and tensioning said belt and biasing means coupled to the carrier for urging the latter toward the belt for maintaining the idler means in engagement therewith, the improvement comprising: said idler shaft forming a part of one of said idler pulley means and idler means carrier; a self-aligning bearing means universally pivotally connecting said carrier to one of said idler pulley means and pivot for relative universal movement, about a point located equidistant from said opposite ends of the rim means of the pulley means, in response to unbalanced belt forces.

2. The belt drive defined in claim 1 wherein said pulley means is a single pulley.

3. The belt drive defined in claim 2 wherein said idler shaft forms part of said carrier; and said self-aligning bearing means universally pivotally couples said idler shaft of the carrier to the pulley.

4. The belt defined in claim 3 wherein said self-aligning bearing means includes a substantially spherical first element; low friction bearing means freely rotatably mounting the first element on the idler shaft and an annular second element carried by the pulley and having an inner surface shaped to conform to and being slidably received on the spherical first element.

5. The belt drive defined in claim 3 wherein said self-aligning bearing means includes a substantially spherical first element carried by said idler shaft, an annular second element, a low friction bearing means freely rotatably mounting said second element to said pulley and said second element having an inner surface shaped to conform to and slidably received on the spherical first element.

6. The belt drive defined in claim 1 wherein said idler shaft forms part of said pulley means; and said pulley means includes a pair of axially spaced pulleys freely rotatably mounted on said idler shaft.

7. The belt drive defined in claim 6 wherein said self-aligning bearing means includes a substantially spherical first element carried by said idler shaft and an annular second element carried by said carrier and having an inner surface shaped to conform to and being slidably engaged with said first element.

8. The belt drive defined in claim 1 wherein said idler shaft forms part of the carrier; and said self-aligning bearing means couples said carrier to said pivot.

* * * * *